United States Patent Office 3,432,630
Patented Mar. 11, 1969

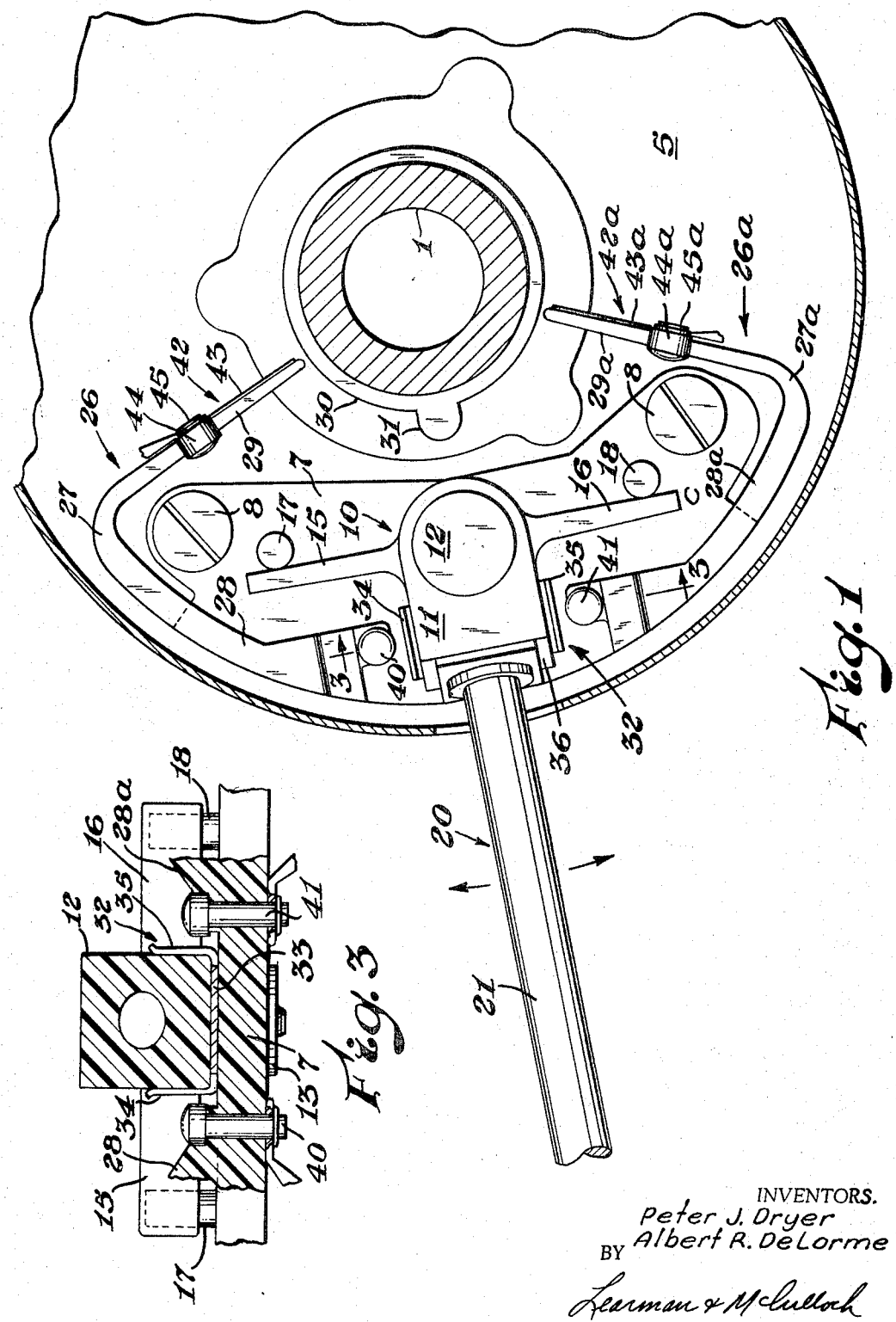

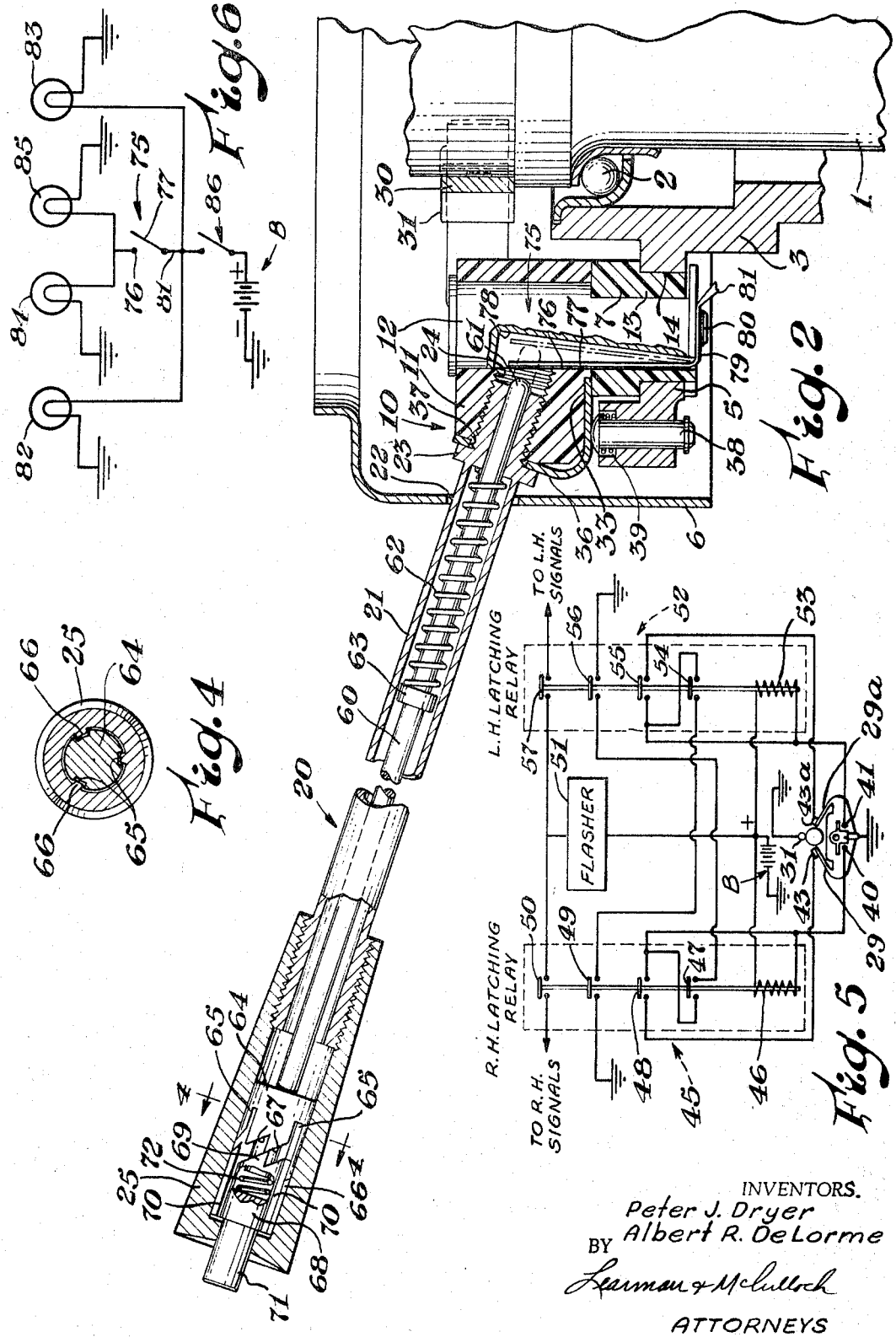

3,432,630
DIRECTION SIGNAL OPERATING APPARATUS
Peter J. Dryer, Warren, and Albert R. De Lorme, Detroit, Mich., assignors, by mesne assignments, to Essex Wire Corporation, Fort Wayne, Ind., a corporation of Michigan
Filed Mar. 15, 1965, Ser. No. 439,716
U.S. Cl. 200—61.34  8 Claims
Int. Cl. H01h 3/16

This invention relates to apparatus for energizing and deenergizing electrically operable direction signaling devices for vehicles and more particularly to apparatus of the kind wherein the direction signals may be energized manually and deenergized or canceled in response to rotation of the vehicle's steering means.

The great majority of direction signal operating apparatus currently in use on vehicles includes manually operable actuating means located adjacent the vehicle's steering wheel and which may be moved manually from a neutral position to either of two operating positions and releasably latched therein so as to indicate selectively a left-hand or right-hand turn. Such apparatus usually incorporates means responsive to rotation of the vehicle's steering wheel upon completion of a turn to effect cancellation of the signals. The canceling means conventionally includes a finger or the like supported on the actuating means for movement with the latter to a position in which it projects toward the path of rotation of a cam which may be mounted either on the vehicle's steering wheel or its steering shaft so as to be rotatable relatively to the finger. Upon the completion of a turn, rotation of the vehicle's steering mechanism effects engagement between the cam and the finger so as to exert sufficient force on the latter to release the latched parts and restore the actuating means to its neutral position, thereby canceling the energized direction signals.

Although direction signal operating apparatus of the kind described are satisfactory in most instances, there are some instances when their use may be undesirable. For example, actuating apparatus which relies upon cancellation by physical displacement of the actuating member to its neutral position in response to the exertion of a force on the actuating member by a rotating cam necessarily requires a rather precise concentricity relationship between the rotatable cam and the part to be engaged by the cam. It sometimes happens that the assembly of the steering apparatus with the direction signal operating mechanism results in a nonconcentric relationship. Unless the concentricity tolerances are maintained, it may not be possible to effect reliable cancellation of the direction signals or, alternatively, the canceling force exerted on the canceling means may be so great as to shift the actuating member from one direction indicating position through the neutral position and to its other direction indicating position. In such cases there is risk of permanently damaging the direction signal actuating means.

An object of this invention is to provide direction signal operating apparatus which overcomes the disadvantages referred to above.

Another object of the invention is to provide direction signal operating apparatus which does not require latching of any of the parts in any position.

A further object of the invention is to provide canceling apparatus for deenergizing direction signals in response to rotation of a vehicle's steering mechanism and in which concentricity tolerances may be much larger than heretofore has been possible.

Another object of the invention is to provide direction signal operating apparatus in which cancellation of the direction signals imposes no appreciable load on the direction signal operating apparatus or on the steering mechanism of the vehicle.

A further object of the invention is to provide means for energizing a vehicle's direction signals and means independent of the energizing means for deenergizing the sigals.

Another object of the invention is to provide direction signal operating apparatus which is inherently incapable of overcancellation.

A further object of the invention is to provide direction signal actuating mechanism which is capable of incorporating means for actuating other apparatus in addition to direction signals.

Other objects and advantages of the invention will be pointed out specifically or will become apparent from the following description when it is considered in conjunction with the appended claims and the accompanying drawings, in which:

FIGURE 1 is a fragmentary view partly in plan and partly in section of direction signal operating apparatus constructed in accordance with the invention and assembled with a vehicle's steering mechanism;

FIGURE 2 is a fragmentary, sectional view taken on the line 2—2 of FIGURE 1;

FIGURE 3 is a sectional view taken on the line 3—3 of FIGURE 1;

FIGURE 4 is a sectional view taken on the line 4—4 of FIGURE 2;

FIGURE 5 is a schematic wiring diagram illustrating a typical direction signaling circuit adapted for use with apparatus constructed in accordance with the invention; and FIGURE 6 is a schematic wiring diagram of additional circuitry with which the apparatus is adapted for use.

The disclosed direction signal operating apparatus is adapted for use in conjunction with a rotatable steering shaft 1 of a vehicle which is journaled by bearings 2 in a tubular, metallic column 3 which may be secured in any suitable and conventional manner to the frame of a vehicle. The shaft projects beyond the column 3 for connection to a steering wheel (not shown). Adjacent the upper end of the column 3 is a peripheral, metallic flange 5 to which is secured a generally annular housing 6.

Direction signal operating apparatus constructed in accordance with the invention comprises a base member 7 formed of electrically insulating material such as nylon or the like and which is fixed to the flange 5 by suitable means such as screws 8. Manually manipulatable actuating means is designated generally by the reference character 10 and comprises a block or body 11 formed of nylon or other suitable insulating material and which is freely rockable on a metal post 12 mounted in an opening formed in the base 7, the base having a tubular projection 13 accommodated in an opening 14 formed in the flange 5 adjacent the shaft 1. Means is provided for restraining rotation of the body 11 on the post 12 and for constantly urging the body 11 to a normal or neutral position, and such means comprises a pair of thin, relatively flexible fingers 15 and 16 which preferably are molded integrally with the body 11. The finger 15 abuts an upstanding post 17 carried by the base 7, and the finger 16 abuts a similar post 18. The arrangement is such that the engagement of the fingers with their respective posts normally maintains the body 11 in a neutral position, but the flexibility of the fingers 15 and 16 enables rocking of the body 11 from the neutral position shown in FIGURE 1 to either of two operating positions on opposite sides of the neutral position.

An operating handle assembly 20 is provided for rocking the body 11 from its neutral position to either of its operating positions and comprises a tubular sleeve 21 which projects through an opening 22 formed in the housing 6 and terminates in a metallic, threaded nipple 23 which is received in a correspondingly threaded opening 24 formed in the body 11. The other end of the sleeve 21 may be threaded for removable reception of a correspondingly threaded, hollow tip 25.

The apparatus includes canceling means comprising a pair of thin, highly flexible arms 26 and 26a which preferably are integrally molded with the base 7. The arm 26 is bent between its ends to form an elbow 27. In one direction from the elbow 27 extends a root end 28 which is anchored to the base 7, and in the other direction from the elbow 27 extends a free arm section 29 which projects radially toward the axis of rotation of the shaft 1. The arm 26a is identical to the arm 26 and similar parts are identified by similar reference characters, followed by the suffix a.

Fixed to the shaft 1 for rotation therewith is a metal band 30 on which is supported a metallic, radially projecting cam 31. The radial length of the cam 31 and the length of each arm 26, 26a are such that the cam 31 may engage each arm in succession in response to rotation of the shaft 1. Preferably, the cam 31 is so located with respect to the shaft 1 that, when the steering shaft is in a position to permit straight line travel of the vehicle, the cam 31 will be located substantially midway between the arms 26, 26a.

Although both the actuation means 10 and the canceling arms 26, 26a are mounted on the base member 7, the actuating and canceling parts are independent of each other in the sense that either may move without imposing any stress on the other.

Mounted on the actuating body 11 for movement therewith is a movable contact or switching member 32 formed of electrically conductive material. The member 32 comprises a web 33 (see FIGURE 2) which is interposed between the body 11 and the base 7. The web 33 terminates at two of its opposite sides in upstanding legs 34 and 35 which straddle the body 11 and grip its opposite sides. The web 33 also includes a third upstanding leg 36 having an opening 37 therein through which the metallic nipple 23 extends.

Beneath the switching member 32 and carried by the flange 5 is an electrically conductive contact 38 which constantly is urged into engagement with the web 33 by means of a spring 39. The engagement between the flange 5 and the contact 38 electrically grounds the latter.

A pair of electrically conductive contacts 40 and 41 are supported by the base 7 on opposite sides of the axis of rotation of the member 10 and adjacent to but spaced from the contact legs 34 and 35, respectively. The contacts 40 and 41 are insulated from the flange 5 by the base 7. As is indicated in FIGURES 1 and 3, the contacts 40 and 41 are free from engagement with the switching member 32 when the actuating body member 11 is in its neutral position, but one or the other of the contacts 40 and 41 may be engaged by the associated contact leg 34 or 35 when the body 11 is moved from its neutral position to one or the other of its operating positions.

The canceling arm 26 is provided with canceling switch means 42 comprising an electrically conductive blade 43 which is fixed to the outboard side of the arm portion 29 by suitable means such as a clip 44 forming an integral part of the blade 43 and which may be secured to the arm portion 29 by means of a rivet 45. Similar canceling switch means 42a is provided for the canceling arm 26a and similar parts are identified by similar reference characters, followed by the suffix a. The blade 43a also is located on the outboard side of the arm portion 29a. The construction and arrangement of the canceling switch means are such that when the shaft 1 is rotated clockwise, as viewed in FIGURE 1, the cam 31 will engage the inboard side of the arm 29 and momentarily deflect the latter out of the path of the cam without effecting engagement between the cam 31 and the conductive blade 43. Continued rotation of the shaft 1 in the clockwise direction will cause engagement between the cam 31 and the conductive blade 43a, followed by momentary deflection of the arm 29a out of the path of rotation of the cam. Rotation of the shaft 1 counterclockwise from the position shown in FIGURE 1 will cause momentary deflection of the arm 29a without engagement between the cam 31 and the blade 43, but further counterclockwise rotation then will effect engagement between the cam 31 and the blade 43a, followed by momentary deflection of the arm 29a out of the path of the cam.

The electrical apparatus for the direction signal mechanism is illustrated in FIGURE 5 and comprises a right-hand latching relay 45 of known construction having a winding 46 and four normally open contacts 47, 48, 49, and 50, the contact 50 occupying a position in a line extending from a flasher 51 of known construction to the vehicle's right-hand signaling devices which may be grounded to the vehicle frame, as is conventional. A left-hand latching relay 52, similar to the relay 45, includes a winding 53 and four normally open contacts 54–57, the contact 57 occupying a position in a line extending between the flasher 51 and the left-hand signals which also may be grounded to the vehicle frame.

In the operation of the apparatus to indicate a right-hand turn, for example, the vehicle driver may move the operating handle 20 clockwise from the position shown in FIGURE 1 a distance sufficient to effect engagement between the contacts 34 and 40, thereby establishing a circuit from the vehicle's power source, such as a battery B, through the winding 46 and through the contacts 40, 34 and 38 to ground, thereby energizing the winding 46 to effect closing of the contacts 47–50 and latching of those contacts in their closed positions. Immediately upon engagement of the contacts 34 and 40, the driver may release the handle 20, whereupon the spring finger 15 will restore the actuating member 10 to its neutral position. Restoration of the actuating member to its neutral position will break the circuit to the winding 46, but since the contacts 47–50 are latched in their closed positions, a circuit will be completed from the battery B through the flasher 51 and the contact 50 to the right-hand turn signals so as to energize the latter and cause them to flash to indicate a right-hand turn.

As the vehicle is turned to the right, the shaft 1 will rotate in a clockwise direction, whereupon the cam 31 will engage the inboard surface of the arm member 29 and deflect the latter out of the path of the cam without permitting engagement between the cam and the blade 43. Should the shaft be rotated clockwise a distance sufficient to enable the cam 31 to engage the conductive blade 43a, no electrical operation will be affected inasmuch as the relay contact 57 is open. When the right-hand turn has been completed, the shaft 1 will be rotated in a counter-clockwise direction so as to effect engagement between the cam 31 and the conductive blade 43. Since the cam 31 is grounded to the vehicle frame via the shaft 1, its engagement with the blade 43 will establish a circuit from the battery B through the winding 46, through the contact 48, and through the blade 43 to the cam 31, thereby energizing the winding 46 to unlatch the contacts 47–50 and break the circuit to the right-hand signals.

The operation of the apparatus to indicate a left-hand turn is the same as has been described, but the other latching relay 52 and its associated parts are utilized.

Electrical lockout means is provided to prevent simultaneous operation of the left-hand and right-hand direction signals in the event the actuating means should be moved to one turn indicating position and then to the other without cancellation of the first actuated signal in the manner previously described. As disclosed, the electrical lockout utilizes the contacts 47 of the right-hand relay 45 in conjunction with the grounded contact 56 of the left-hand relay 52, and utilizes the contact 54 of the left-hand relay in conjunction with the grounded contact 49 of the right-hand relay.

To illustrate the use of the electrical interlock, assume that the right-hand direction signals have been energized in the manner previously described so as to effect latching of the contacts 47–50 in their closed positions. If, in these positions of the parts, the operating handle 20 is rocked counterclockwise so as to energize the left-hand relay 52 and close the contacts 54–57, a circuit will be completed from the battery B through the winding 46, through the closed contact 47 and through the closed contact 56 to ground so as to energize the winding 46 and release the contacts 47–50, thereby deenergizing the right-hand signals while maintaining the left-hand direction signals energized. Should the left-hand relay 52 be energized and then the right-hand relay 45 be energized prior to cancellation of the left-hand direction signals, the energization of the relay 45 will enable a circuit to be completed from the battery B through the winding 53 and through the contact 54 to and through the contact 49, thereby energizing the winding 53 and effecting release of the contacts 54–57.

Apparatus constructed in accordance with the invention lends itself to uses other than that of operating direction signals only. As illustrated, the apparatus is provided with auxiliary switch means comprising an elongated rod 60 slideably mounted in the handle sleeve 21 and terminating at one end in a nose 61 which extends through and beyond the nipple 23. A spring 62 surrounds the rod 60 and reacts between the nipple 23 and an enlargement 63 on the rod so as constantly to urge the latter to an outwardly projected position. Fixed to the other end of the rod 60 is an indexable latch part 64 having a number of axially extending grooves 65 therein which, in one position of the part 64, may be axially aligned with longitudinally extending ribs 66 projecting inwardly from the bore of the tip member 25. The outer end of the part 64 is provided with a plurality of inclined teeth 67.

An operating member 68 is mounted in the member 25 for axial movement and is provided at its inner end with inclined teeth 69 that are adapted to bear against the teeth 67. The member 68 is restrained against rotation by grooves 70 which receive the ribs 66. Secured to the member 68 is a stem 71 which projects through an opening formed in the free end of the tip 25, and the tip normally is maintained in a projected position by a spring 72 which is interposed between the members 64 and 68.

The construction and arrangement of the auxiliary switch operating parts are such that depression of the stem 72 from the position shown in FIGURE 2 causes the member 68 to exert a force on the member 64 to move it and the rod 60 axially to the right until such time as the member 64 has been moved a distance sufficient to remove the ribs 66 from the grooves 65, whereupon the complementally inclined teeth 67 and 69 will rotate the member 64 to a position in which the ribs 66 are aligned with interspaces between the teeth 67. The depth of the interspaces is less than the depth of the grooves 65. Upon release of the stem by the vehicle driver, the springs 62 and 72 will act on rods 60 and the member 68, respectively, so as to urge them to the left, but the ribs 66 will be received in the interspaces between the teeth 67 and prevent full projection of the rod 60. The spring 72 will restore the member 68 to its fully projected position so as to disengage the teeth 67 and 69. The capacity of the spring 62 should be such that when the teeth 67 and 69 are disengaged, the engagement between the teeth 67 and the ribs 66 will effect further rotation of the member 64. When the member 68 is again depressed, the engagement of the teeth 67 and 69 will effect further rotation of the member 64 to such position that, upon release of the stem 71, the grooves 65 once again will be aligned with the ribs 66 and enable the spring 62 to project the rod 60 and the member 64 to their fully projected positions.

In the illustrative embodiment of the invention the auxiliary switch operating means is adapted to open and close an auxiliary switch 75 comprising a fixed contact 76 supported on the body 11 and a movable contact blade 77 which may be accommodated in a recess 78 formed in the post 12 and having a mounting leg 79 anchored to the post 12 by a binding post 80 to which also may be connected to a conductor 81. The arrangement is such that when the auxiliary switch operating rod 60 is in its fully projected position, as is shown in full lines in FIGURE 2, the auxiliary switch 75 is closed, but when the rod 60 is in its retracted position, as is shown in dotted lines in FIGURE 2, the switch 75 is open.

FIGURE 6 discloses schematically a typical circuit for a vehicle having left and right low beam headlamps 82 and 83, respectively, each of which is grounded to the vehicle frame. Left and right high beam headlamps 84 and 85, respectively, also are provided. A main switch 86 controls actuation of all of the headlamps from the battery B, and the auxiliary switch 75 controls the operation of the high beam headlights 84 and 85. The arrangement is such that once the switch 86 is closed the high beam headlights 84 and 85 may be turned off and on by opening and closing of the switch 75 in the manner described.

The disclosed embodiment is representative of a presently preferred form of the invention, but is intended to be illustrative rather than definitive thereof. The invention is defined in the claims.

What is claimed is:

1. Direction signal operating apparatus comprising support means; first contact means carried by said support means; an actuator member; means mounting said actuator member on said support means for rocking movement about an axis from a neutral position to an operating position on either side of said neutral position; second contact means carried by said actuator member for engagement with said first contact means in response to movement of said actuator member to either operating position; operating means connected to said actuating member for moving the latter from said neutral position to either operating position; resilient finger means carried by said actuator member for rocking movement therewith; and stop means carried by said support means for engagement by said finger means in response to movement of said actuator member toward either operating position by said operating means, the resilience of said finger means resisting but permitting movement of said actuator member to either operating position and restoring said actuator member to said neutral position upon release of said operating means.

2. The apparatus set forth in claim 1 wherein said finger means comprises a pair of fingers extending on opposite sides of said axis.

3. The apparatus set forth in claim 2 wherein said stop means comprises a pair of stops located on opposite sides of said axis and engaging the respective fingers when said actuator member is in said neutral position.

4. The apparatus set forth in claim 1 including a pair of resilient arm members; means mounting said arm members on opposite sides of said axis; and electrically conductive part mounted for rotation about a second axis between said arm members for engagement with each of said arm means in response to rotation of said part in either of two opposite directions; and third contact means mounted on each of said arm members outboard of said second axis whereby said part is engageable with the third contact means on only one of said arm members in response to rotation of said part in a selected direction of rotation of said part.

5. Apparatus for energizing and deenergizing a selected one of two electrically operable direction signaling means adapted for use with a vehicle having cam means rotatable in a path in either of two opposite directions about an axis, said apparatus comprising movable actuating means; means mounting said actuating means for movement from a neutral position to either one of two operating positions; switch means connected to said actuating means and responsive to movement of said actuating means to a selected one of said operating positions to energize a selected one of said signaling means; first and second canceling switch means; and supporting means supporting said first and second canceling switch means respectively on opposite sides of said axis at all times in the path of rotation of said cam means, said supporting means being interposed between the respective canceling switch means and said axis for precluding engagement between said first canceling switch means and said cam means except in response to rotation of the latter in one of said directions and for precluding engagement between said second canceling switch means and said cam means except in response to rotation of the latter in the opposite one of said directions, engagement of said cam means and a selected one of said canceling switch means being operable to deenergize a selected one of said signaling means.

6. The apparatus set forth in claim 5 wherein said actuating means is rockable about a second axis.

7. The apparatus set forth in claim 5 including means constantly acting on said actuating means opposing its movement to either of said operating positions and for returning said actuating means to said neutral position.

8. The apparatus set forth in claim 5 wherein said supporting means comprises first and second flexible arms, each of said arm means being momentarily deflectable out of said path in response to engagement between said cam means and the associated canceling switch means.

References Cited
UNITED STATES PATENTS

| | | | |
|---|---|---|---|
| 1,620,456 | 3/1927 | Gallus et al. | 335—125 |
| 2,337,809 | 12/1943 | Gaynor | 200—165 |
| 2,608,627 | 8/1952 | Paule et al. | 200—61.34 |
| 3,120,588 | 2/1964 | Brown | 200—61.34 |

BERNARD A. GILHEANY, *Primary Examiner.*

R. COHRS, *Assistant Examiner.*